June 18, 1929.  T. REINARTZ  1,717,408
BRAKE OPERATING MECHANISM
Filed Aug. 11, 1926   2 Sheets-Sheet 2
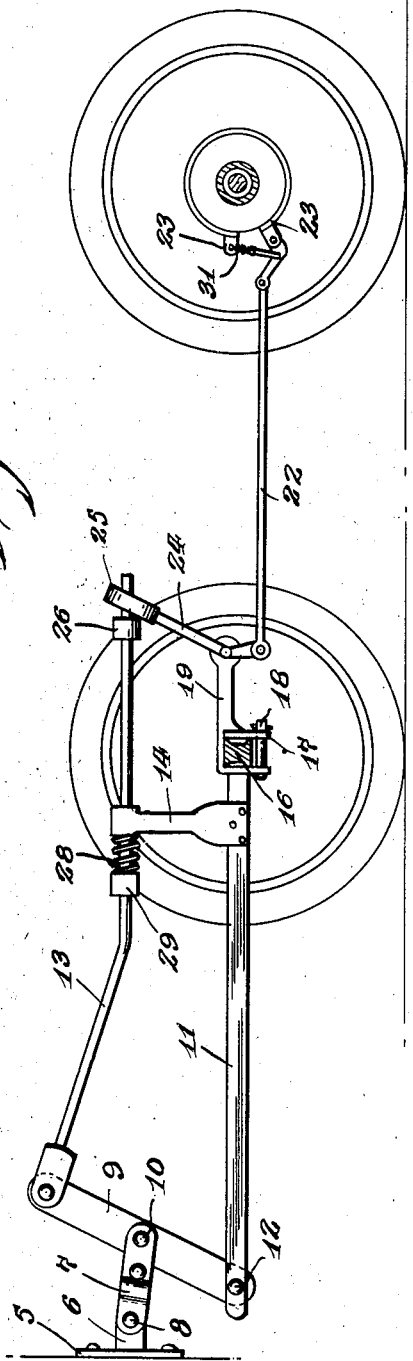
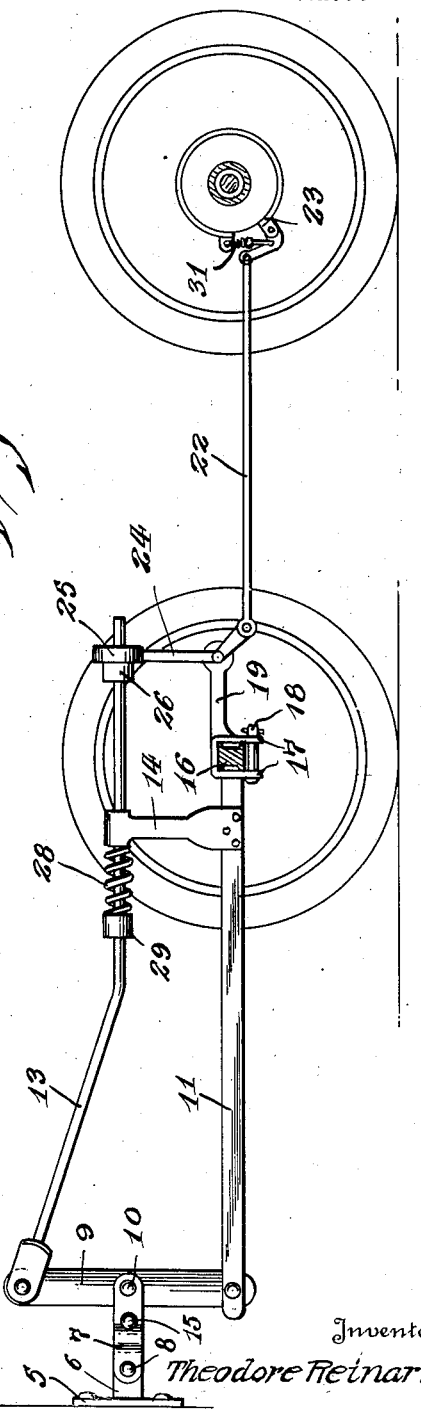
Inventor
Theodore Reinartz
By W.E. Beck Jr.
Attorney Patented June 18, 1929.

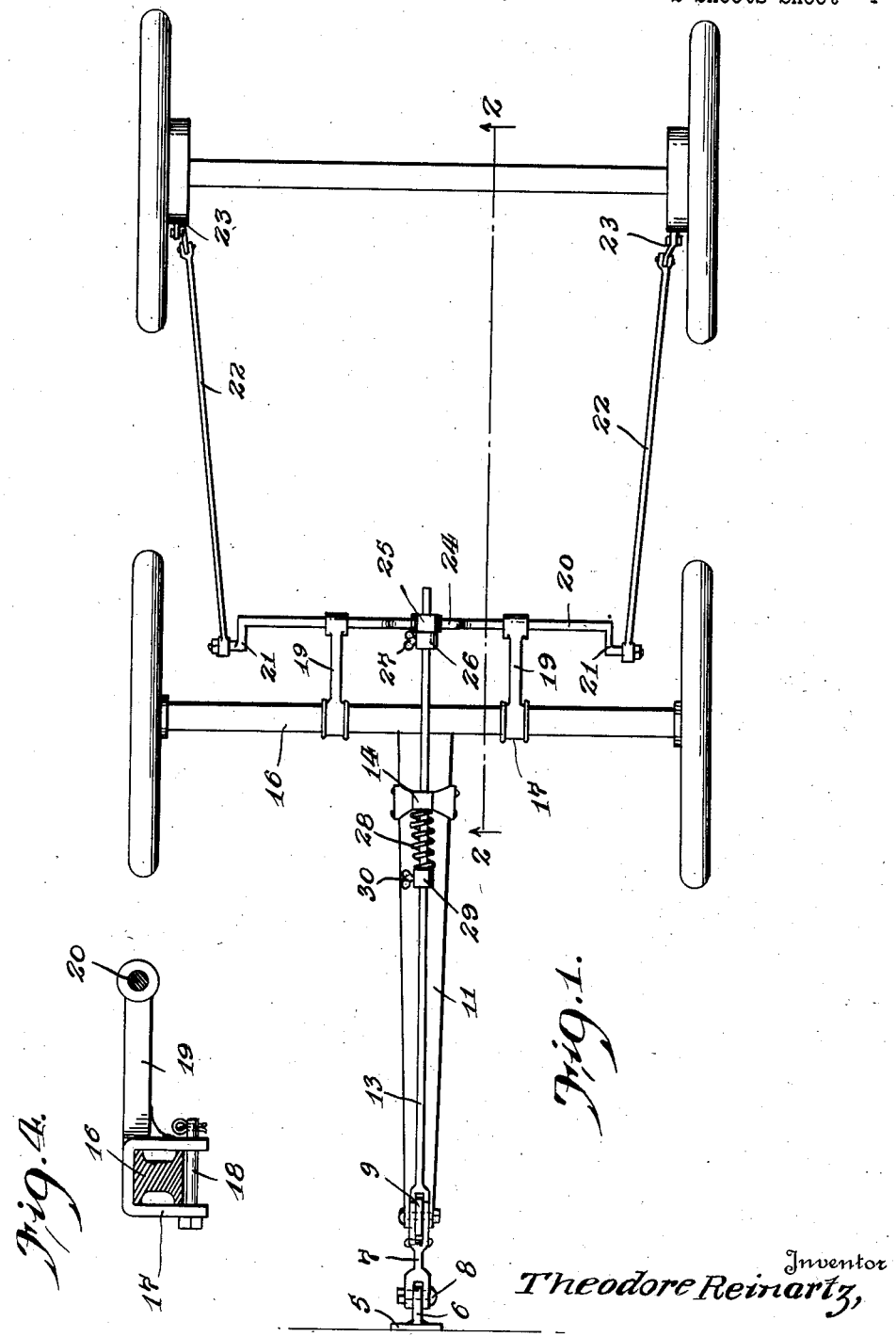

1,717,408

UNITED STATES PATENT OFFICE.

THEODORE REINARTZ, OF ETHAN, SOUTH DAKOTA.

BRAKE-OPERATING MECHANISM.

Application filed August 11, 1926. Serial No. 128,688.

My invention relates to brake operating attachments for trailers and has for its object to provide a pivotal coupling between the trailer and towing vehicles and arranged so that upon decreasing the forward momentum of the towing vehicle the brakes will automatically be applied to the wheels of the trailer.

Another object is to provide an apparatus of this character which may be readily installed upon a trailer without necessitating any changes in the construction of the vehicle and which may be used in towing a train of vehicles of any desired number.

A further object is to provide an apparatus of this character which is comparatively simple in construction, durable, effective in operating and relatively inexpensive to manufacture and install.

Other objects and advantages will become apparent from the following detailed description when viewed together with the accompanying drawing forming part hereof, wherein like numerals refer to like parts throughout, and in which—

Figure 1 is a plan view,

Figure 2 is a view in side elevation showing the apparatus in position with the brakes applied, Figure 3 is a similar view with the brakes released, and Figure 4 is a detail of the axle bracket.

Referring now to the drawings wherein for the purpose of illustration I have disclosed a preferred embodiment of my invention, I provide a trailer coupling comprising an attaching plate 5 which is secured to some rigid portion of the towing vehicle, and having a rearwardly extending lug 6 formed integral therewith. A link 7 is pivotally connected at one end to the lug by a pin 8 and at its opposite end a vertically disposed lever 9 is pivotally attached by a pin 10.

The lower end of the lever is pivotally connected to the tongue 11 of the trailer vehicle by a pin 12 and the upper end thereof has a rearwardly extending rod 13 pivotally connected thereto. The rod 13 is preferably angular with its forward portion inclined downwardly toward the rear and its rear portion arranged horizontal with the tongue and is supported above the same by a vertically extending post 14 having its lower end bolted to the tongue and its upper end provided with a bore through which the rod is slidably inserted.

A pair of brackets are carried by the front axle 16 of the trailer and comprises an inverted U-shaped member 17 adapted to fit over the axle and firmly secured thereon by a bolt 18 and a rearwardly extending arm 19, having a transversely arranged bore in the end thereof, said brackets being spaced apart near each end of the axle. A transversely extending rod 20 is inserted through the bores of each bracket and has its ends formed into cranks 21. Brake rods 22 are connected at one end to said cranks and extend rearwardly to operatively connect with the wheel brakes 23.

A vertically extending arm 24 is fixedly secured upon the rod 20 intermediate its ends and has its upper end provided with an annular ring 25 through which the rear end of the rod 13 is loosely inserted. A collar 26 is fitted on the rod 13 forwardly of the ring and is adjustable longitudinally thereon, being held in position by a set screw 27, so that the forward movement of the ring is regulated.

A coil spring 28 is carried on the rod 13 immediately forward of the post 14 and is retained in position thereon by a collar 29 slidably fitted on the rod and adjustably secured by a set screw 30.

In operation as the trailer is being towed through the coupling and the lever connected to the tongue the brakes are released to permit the free rotation of the wheels, springs 31 attached to the brake drums being provided to normally maintain the brakes in such position. However, as soon as the towing vehicle decreases its momentum sufficiently to allow the trailer to push against the same, the unchecked forward movement of the trailer will cause the tongue to throw the lower end of the lever 9 forwardly causing the upper end thereof to move rearwardly which in turn also pushes the rod 13 rearwardly so as to turn the transverse rod 20 through the vertical arm 24 and thus pull the brake rods to throw on the brakes. As soon as the relative momentum of the vehicle is returned to normal the pressure is released and the apparatus resumes its normal position by means of the spring 28.

The collars 27 and 29 may be adjusted upon the rod 13 so as to increase or decrease the responsive action of the brakes.

In order to permit the towing vehicle to back up without throwing on the brakes of the trailer, a pin 15 is insertable in the coupling so as to limit the throw of the lever 9.

I claim:

1. A brake operating device for trailers comprising a coupling, a vertically disposed lever pivotally mounted thereon and having its lower end attached to the trailer tongue, a longitudinally extending rod attached to the upper end of said lever, a pair of axle clamps, a transverse rod rotatably carried thereby, cranks formed on each end of said transverse rod, brake rods operatively connected to said cranks, a collar adjustably carried on said longitudinal rod and an arm attached to said transverse rod and engageable with said collar.

2. A brake operating device for trailers comprising a coupling, including a plate attachable to a towing vehicle and a link extending therefrom, a vertically disposed lever pivotally connected to said link and having its lower end attached to the trailer tongue, a longitudinally extending rod attached to the upper end of said lever, a pair of axle clamps, a transverse rod rotatably carried thereby, cranks formed on each end of said transverse rod, brake rods operatively connected to said cranks, a collar adjustably carried on said longitudinal rod, an arm secured to said transverse rod, a ring formed thereon for receiving said longitudinal rod and arranged in abutting relation with said collar, a post secured to the trailer tongue and slidably supporting said longitudinal rod, a collar adjustably secured on said rod and a coil spring tensionally held between said post and said collar as and for the purposes set forth.

In testimony whereof I affix my signature.

THEODORE REINARTZ.